US012085482B2

(12) United States Patent
Forestelli

(10) Patent No.: US 12,085,482 B2
(45) Date of Patent: Sep. 10, 2024

(54) METHOD AND APPARATUS FOR RECOGNIZING THE PRESENCE OF LEAKAGES FROM SEALED CONTAINERS

(71) Applicant: FT SYSTEM SRL, Alseno (IT)

(72) Inventor: Fabio Forestelli, Alseno (IT)

(73) Assignee: FT SYSTEM S.R.L., Alseno (IT)

( * ) Notice: Subject to any disclaimer, the term of this patent is extended or adjusted under 35 U.S.C. 154(b) by 286 days.

(21) Appl. No.: 17/611,157

(22) PCT Filed: May 14, 2020

(86) PCT No.: PCT/IB2020/054556
§ 371 (c)(1),
(2) Date: Nov. 14, 2021

(87) PCT Pub. No.: WO2020/230068
PCT Pub. Date: Nov. 19, 2020

(65) Prior Publication Data
US 2022/0221366 A1    Jul. 14, 2022

(30) Foreign Application Priority Data

May 16, 2019   (IT) .......................... 102019000006920

(51) Int. Cl.
*G01M 3/22*    (2006.01)
*G01M 3/20*    (2006.01)

(52) U.S. Cl.
CPC ............ *G01M 3/226* (2013.01); *G01M 3/205* (2013.01)

(58) Field of Classification Search
CPC ...... G01M 3/229; G01M 3/226; G01M 3/227; G01M 3/20; G01M 3/3281

(Continued)

(56) References Cited

U.S. PATENT DOCUMENTS 3,186,214 A * 6/1965 Roberts ................. G01M 3/226
73/40
3,577,769 A * 5/1971 Roberts ................. G01M 3/229
73/40.7

(Continued)

FOREIGN PATENT DOCUMENTS

DE  102014222786 A1   5/2016
DK  201570808 A1   6/2017

(Continued)

OTHER PUBLICATIONS

International Search Report and Written Opinion of the International Searching Authority issued for International PCT Application No. PCT/IB2020/054556 on Aug. 6, 2020.

*Primary Examiner* — Patrick Assouad
*Assistant Examiner* — Mark A Shabman
(74) *Attorney, Agent, or Firm* — Howson & Howson LLP

(57) ABSTRACT

A method for recognizing the presence of leakages from sealed containers includes defining a detection zone in which a sealed container will be placed, putting the detection zone in communication with at least one gas sensor through at least one duct, introducing a flushing gas into the detection zone through the duct, placing a container in the detection zone; and sucking a gas flow from the detection zone through the duct and transferring it to a first sensor. The gas flow that reaches the first sensor is either transferred to a second sensor or to the first sensor for a second time. The signals generated by the two sensors, or the two signals generated by the same sensor, are processed for determining the presence of a gas leakage in the container.

6 Claims, 5 Drawing Sheets

(58) Field of Classification Search
USPC .................................................. 73/40–49.8
See application file for complete search history.

(56) References Cited

U.S. PATENT DOCUMENTS

| | | | |
|---|---|---|---|
| 3,708,949 A | 1/1973 | Wilcox | |
| 3,729,983 A * | 5/1973 | Coppens | G01M 3/229 |
| | | | 73/40.7 |
| 3,762,212 A * | 10/1973 | Morley | G01M 3/202 |
| | | | 376/250 |
| 5,128,269 A * | 7/1992 | Oitate | G01R 31/1254 |
| | | | 73/40.7 |
| 5,172,583 A * | 12/1992 | Tallon | G01M 3/202 |
| | | | 73/40.7 |
| 5,386,717 A * | 2/1995 | Toda | G01M 3/202 |
| | | | 73/40.7 |
| 5,553,483 A * | 9/1996 | Armentrout | G01M 3/229 |
| | | | 73/40 |
| 5,889,199 A | 3/1999 | Wong et al. | |
| 6,281,787 B1 * | 8/2001 | Lerg | G08B 15/00 |
| | | | 340/539.1 |
| 6,288,643 B1 * | 9/2001 | Lerg | B60C 23/009 |
| | | | 340/573.1 |
| 6,460,405 B1 * | 10/2002 | Mayer | G01M 3/20 |
| | | | 73/49.3 |
| 6,829,936 B2 * | 12/2004 | Lehmann | G01M 3/04 |
| | | | 73/40 |
| 6,851,316 B2 * | 2/2005 | Micke | G01M 3/02 |
| | | | 73/40 |
| 7,448,256 B2 * | 11/2008 | Jenneus | G01M 3/226 |
| | | | 73/49.2 |
| 7,905,132 B1 * | 3/2011 | Chamberlain | G01M 3/205 |
| | | | 73/40.7 |
| 8,381,577 B2 * | 2/2013 | Bunod | G01M 3/229 |
| | | | 73/40.5 A |
| 8,806,919 B2 * | 8/2014 | Solomon | G01M 3/22 |
| | | | 73/40.7 |
| 8,955,383 B2 | 2/2015 | Huseynov et al. | |
| 9,091,613 B2 | 7/2015 | Baliga | |
| 9,528,905 B2 * | 12/2016 | Pavlik | G01M 3/3218 |
| 9,632,067 B2 | 4/2017 | Wetzig et al. | |
| 9,885,628 B2 * | 2/2018 | Gaw | G01T 1/18 |
| 9,939,342 B2 | 4/2018 | Howieson et al. | |
| 2009/0277249 A1 * | 11/2009 | Polster | G01M 3/229 |
| | | | 73/40.7 |
| 2010/0219960 A1 * | 9/2010 | Moe | G08B 21/16 |
| | | | 73/23.31 |
| 2017/0241964 A1 * | 8/2017 | Vereecken | G01N 33/0047 |
| 2019/0170602 A1 * | 6/2019 | Gupte | F25B 49/005 |
| 2020/0116692 A1 * | 4/2020 | Pratt | G01N 33/0031 |

FOREIGN PATENT DOCUMENTS

| | | |
|---|---|---|
| WO | 2012/166585 A2 | 12/2012 |
| WO | 2013/011329 A2 | 1/2013 |
| WO | 2017/125386 A2 | 7/2017 |

* cited by examiner

METHOD AND APPARATUS FOR RECOGNIZING THE PRESENCE OF LEAKAGES FROM SEALED CONTAINERS

TECHNICAL FIELD

The invention concerns a method and an apparatus for recognizing the presence of leakages from sealed containers. The method and the apparatus according to the invention are capable of recognizing the presence of leakages of fluids from sealed containers. More particularly, but not exclusively, said fluids can be in gas or vapour state and can consist of gases or gas mixtures, or of vapours or vapour mixtures, or of gas and vapour mixtures. Said containers can be both rigid containers, such as for instance glass jars or bottles, and containers having at least one flexible wall portion, such as for instance plastic tubs, bags and flexible packages of different kinds.

PRIOR ART

At present, many beverages and products intended for use as food, of for other uses, are preserved by mainly using one of the following packaging ways.

According to a first way, mainly used for preserving liquids, a rigid or semi-rigid container is filled with the substance to be preserved through a suitable opening provided for in the container. Subsequently, the opening is sealed by means a suitable closing element, for instance a cap. In other cases, the product to be preserved is wrapped by means of ribbons or films or is introduced into tubes of flexible plastic material, and subsequently the package thus obtained is sealed by welding along one or more junction lines. In still other cases, it is known to use tubs of plastic material formed in advance. The tubs are filled through an opening provided therein and subsequently the opening is sealed by means of a plastic film welded to the tub walls.

More generally, food products, but non only, are preserved in sealed packages aimed at preserving as long as possible unchanged in time the chemical-physical characteristics the product has at the packaging time.

Thus, one of the main problems encountered in applying the aforesaid methods is how to obtain an optimal sealing of the package in order to avoid contaminations with the outside environment. In many applications, an optimal sealing results in a closure that has to be substantially hermetic at the outside pressure at which the package is kept, or anyway at the pressure the package is subjected to during its normal use, transportation and storage. For instance, in case of food products, the package has to be substantially hermetic when it is at atmospheric pressure, to prevent the environment inside the package from communicating with the outside environment thereby causing substance and air to pass from one environment to the other, and hence to prevent the risk of contaminating the packaged product and the decay of its organoleptic properties.

In case of containers sealed by welding, the hermetic sealing of the package can be jeopardised for instance by an imperfect welding due for instance to a wrong execution of the welding process. Errors in setting the welding temperature, a wrong choice in the adhesive weld material, the imperfect planarity of the contacting surfaces in the welding area and the presence of impurities or foreign bodies in the welding area are all factors that can compromise the attainment of a hermetic sealing of the container.

In case of rigid or semi-rigid containers, such as bottles, which are closed by a cap, as well known, the hermetic sealing can be jeopardised for instance by a malformation of the same cap or of the bottle, in the region where the cap is to be applied, or by operation problems of the capping machine, for instance problems of alignment in the cap application step.

Generally, losses of substance from containers occurring because of apparent imperfections in the container closure can be easily detected, even visually, by a heedful operator. Such losses generally entail an evident spillage of substance from the container. Under such circumstances, therefore, a heedful operator, in charge of the supervision of a packaging line, can easily identify imperfect containers and remove them, if necessary, immediately downstream of the filling and sealing step, mainly in order to discard them and to prevent them from being offered to the consumer, or to submit them to further checks or to repairs.

As it can be easily understood, recognition of the presence of leakages from the containers is the more difficult for the operator the smaller is the leakage, as is the case of a leakage due to micro-cracks and micro-holes. Those leakages are defined micro-leaks, i.e. leaks of very small amount from the container, which are not immediately detectable since they do not entail an evident spillage of liquids or other substances, but in the long run they can compromise the product quality. Such micro-leaks are generally caused by cracks of the order of some ten microns and even as small as some microns, for instance 3-7 μm.

To solve the problem of how to effectively detect the presence of micro-leaks from sealed containers, several solutions have been hitherto proposed.

A first known solution to the problem of how to detect leakages from heat-sealed containers is disclosed for instance in U.S. Pat. No. 3,708,949 (A). This document discloses a method and an apparatus for forming and subsequently checking the tightness of heat-sealed envelopes. The method disclosed in such a document substantially includes a step in which the container is sealed, after introduction of a modified atmosphere, a step in which the container is submitted to a mechanical stress in order to reduce the volume enclosed by the container walls and consequently increase the pressure of the gases enclosed in the container thereby promoting their spillage if micro-cracks are present, a step in which a gas detector detects the presence, outside the container, of a tracer gas present in the modified atmosphere, and a step in which the container having failed to pass the check is removed.

Another known method for testing the tightness of a thermo-sealed container is disclosed in WO2013/011329 (A2). According to the teaching of this document, the container is filled with a tracer gas and is submitted to compression in order to promote gas spillage through micro-cracks possibly present in the sealing area. Suitable detectors, including pairs of electrodes, are located in the vicinity of the regions of the container where gas micro-leaks are more likely to occur. A change in the electrical voltage at the detector electrodes causes detection of the presence of tracer gas.

WO2017125386 (A2) discloses a method in which a chemical substance, typically in the form of a strip, is applied to the container. The substance is such that its physical and/or chemical properties change depending on the concentration of a gas, for instance oxygen, contacting the substance. The change in the properties of the substance gives rise to a change in the frequency, wavelength or phase of an electromagnetic radiation emitted, detectable by a detector located outside the container.

DK201570808 (A1) discloses an apparatus for detecting gas leaks from sealed containers into which a tracer gas has been introduced. The apparatus includes an analysis chamber, in which the container is received during the hermetic tightness test, and a device capable of creating vacuum inside the chamber. A gas detector is placed in communication with the chamber in order to detect the presence of the tracer gas.

Therefore, according to the teaching of the prior art, the step of detecting micro-leaks is generally performed with the aid of a tracer gas, typically carbon dioxide ($CO_2$), helium (He) or hydrogen ($H_2$), introduced into the container before the latter is sealed. The presence of tracer gas outside the container is generally detected by means of detectors, for instance electrodes, usually when liquids or tracer gases such as He are to be detected, or detectors the operation of which is based on the non-dispersive infrared (NDIR) technique or other techniques, in order to detect $CO_2$ leakages.

It is a first object of the invention to provide a method and an apparatus for recognizing the presence of leakages from sealed containers, which are not subject to the limitations and the drawbacks set forth above of the prior art.

It is another object of the invention to provide a method and an apparatus of the above kind that allow detecting leakages from containers of different kinds, of either rigid or flexible type, with or without mechanical squeezing of the container, even in case the leak is of small or very small amount, i.e. it corresponds to a micro-leak, and is caused by an opening of few microns.

It is a further object of the invention to provide a method and an apparatus for recognizing the presence of leakages from sealed containers allowing an improved operation speed if compared to the prior art, that is a method and an apparatus that allow a faster detection of leakages, if any, and thus allow maximising the operation speed of the production or container processing plant.

It is yet another object of the invention to provide a method and an apparatus of the above kind allowing a higher precision in leakage detection, even in case of perturbations or alterations in the conditions of the surrounding environment.

It is a further, but not the last object of the invention to provide a method and an apparatus that are reliable and can be used in cheap manner, so that they can have a large scale industrial utilisation.

The above and other objects are achieved by means of the method and the apparatus as claimed in the appended claims.

DESCRIPTION OF THE INVENTION

The method for recognizing leakages from sealed containers mainly includes a step in which a detection zone in which a sealed container will be placed is defined and a step in which a gas flow is sucked from said detection zone. The gas flow is transferred to a first sensor arranged to generate an electrical signal indicative of the presence of a given gas in the mixture of the gas flow passing through the sensor.

In accordance with a first embodiment of the invention, at least two sensors are provided, arranged to generate respective signals indicative of the presence of a tracer gas. Both sensors are passed through in series by the same gas flow sucked from the detection zone and, consequently, the second sensor, i.e. the one located downstream of the first sensor, generates a signal delayed with respect to the first sensor.

In a second embodiment of the invention, a single sensor is provided and the delay is obtained by making the same gas flow coming from the detection zone pass through the same sensor, first in one direction and then in the opposite direction.

In accordance with the first embodiment of the invention, the method further includes a step in which said gas flow that has reached the first sensor is transferred to a second sensor, also arranged to generate an electrical signal indicative of the presence of a given gas in the mixture of the gas flow passing through the sensor.

In accordance with the second embodiment of the invention, the method further includes a step in which said gas flow is transferred to the first sensor for a second time, Always in accordance with the invention, moreover, the signals generated by the two sensors, or the two signals generated by the same sensor, are processed in an electronic control unit for determining the presence of a gas leakage in said container.

Still in accordance with the invention, the method includes a step in which the detection zone is put in communication with the first gas sensor and, if provided, with the second gas sensor through at least one air duct, a step in which a container to be checked is placed in said detection zone and a step of in which a gas flow is sucked from said detection zone through said at least one duct for being transferred to the first sensor and, if provided, to the second sensor.

Preferably, according to the invention, the transfer of the gas flow sucked from the detection zone from the first sensor to the second sensor is performed in a seamless manner, i.e. continuously, without interruptions.

In accordance with a first variant of the second embodiment of the invention, said gas flow sucked from the detection zone is transferred for a first time to the first sensor in a first direction and for a second time to the first sensor in the opposite direction Preferably, according to the invention, the two signals generated by the two sensors, or the two signals generated by the same sensor at the first and the second passage of the gas flow, are compared to each other so as to generate a signal indicative of the occurrence of a gas leakage when, at the same time instant, the level of the second signal exceeds the level of the first signal.

Even more preferably, according to the invention, the signal indicative of the presence of a gas leakage is generated when the condition according to which, at the same instant, the level of the second signal exceeds the level of the first signal has repeated at least twice consecutively.

According to an even more preferred embodiment of the invention, the signal indicative of the presence of a gas leakage is generated when the condition according to which, at the same instant, the level of the second signal exceeds the level of the first signal has repeated at least twice consecutively at a rate higher than a predetermined noise threshold.

The apparatus for recognizing leakages from sealed containers mainly includes a detection zone adapted to receive a sealed container and a suction fan adapted to cause suction of an air flow from said detection zone. The apparatus further includes a first gas sensor capable of generating a signal indicative of the presence of gas and a duct, communicating with said detection zone and said first gas sensor, in which the flow sucked by the suction fan passes, the fan being located downstream of the detection zone and downstream of the sensor.

In accordance with a first embodiment of the invention, the apparatus further includes a second sensor capable of generating a signal indicative of the presence of gas(es) and arranged between the first sensor and the suction fan In accordance with a second embodiment of the invention, the apparatus includes means capable of transferring back to the first sensor an air flow that has been sucked from said detection zone and has left the first sensor.

According to the invention, the apparatus further includes processing means for processing the signals generated by the two sensors, or the two signals generated by the same sensor, for determining the presence of a gas leakage in said container.

Preferably, according to a variant of the first embodiment of the invention, the first and the second sensor are arranged in series along a single duct and, always preferably, the first sensor is located upstream of the second sensor in the direction in which air is sucked by the suction fan.

Preferably, according to a variant of the second embodiment of the invention, said means include a reversible fan, or a reversible suction fan, which are capable of generating a flow in a direction opposite to the direction in which the flow was transferred from the detection zone to the sensor.

Preferably, the apparatus according to the invention includes an electronic control unit programmed to compare the signals generated by the two sensors, or the two signals generated by the same sensor, and to generate a signal indicative of the presence of a gas leakage when at the same instant the level of the second signal exceeds the level of the first signal.

Advantageously, the invention allows detecting leakages, even of small amount, that is micro-leaks, of a gas or gas mixture from holes even of small size, that is micro-holes, with sizes as small as few microns, for instance of the order of 3-7 μm, present by chance on the flexible wall of containers.

The recognition method according to the invention is capable of considerably increasing the recognition sensitivity. Such a method allows advantageously increasing the measurement sensitivity, thus making it possible to detect the occurrence of small tracer gas concentrations, due to micro-leaks of said tracer gas from the sample container, in the atmosphere present in the detection region.

Thus, the invention allows recognizing gas micro-leaks from containers in which the tracer gas concentration is little higher than that in the outside environment. According to the invention, such a measurement method can be implemented in the absence of or in combination with a function of modifying the gas mixture composition in the vicinity of the container.

BRIEF DESCRIPTION OF THE FIGURES

Some preferred embodiments of the invention will be provided by way of non-limiting examples with reference to the accompanying Figures, in which.

In all Figures, the same reference numerals have been used to denote equal or functionally equivalent components.

DESCRIPTION OF A PREFERRED EMBODIMENT

Figure 1:
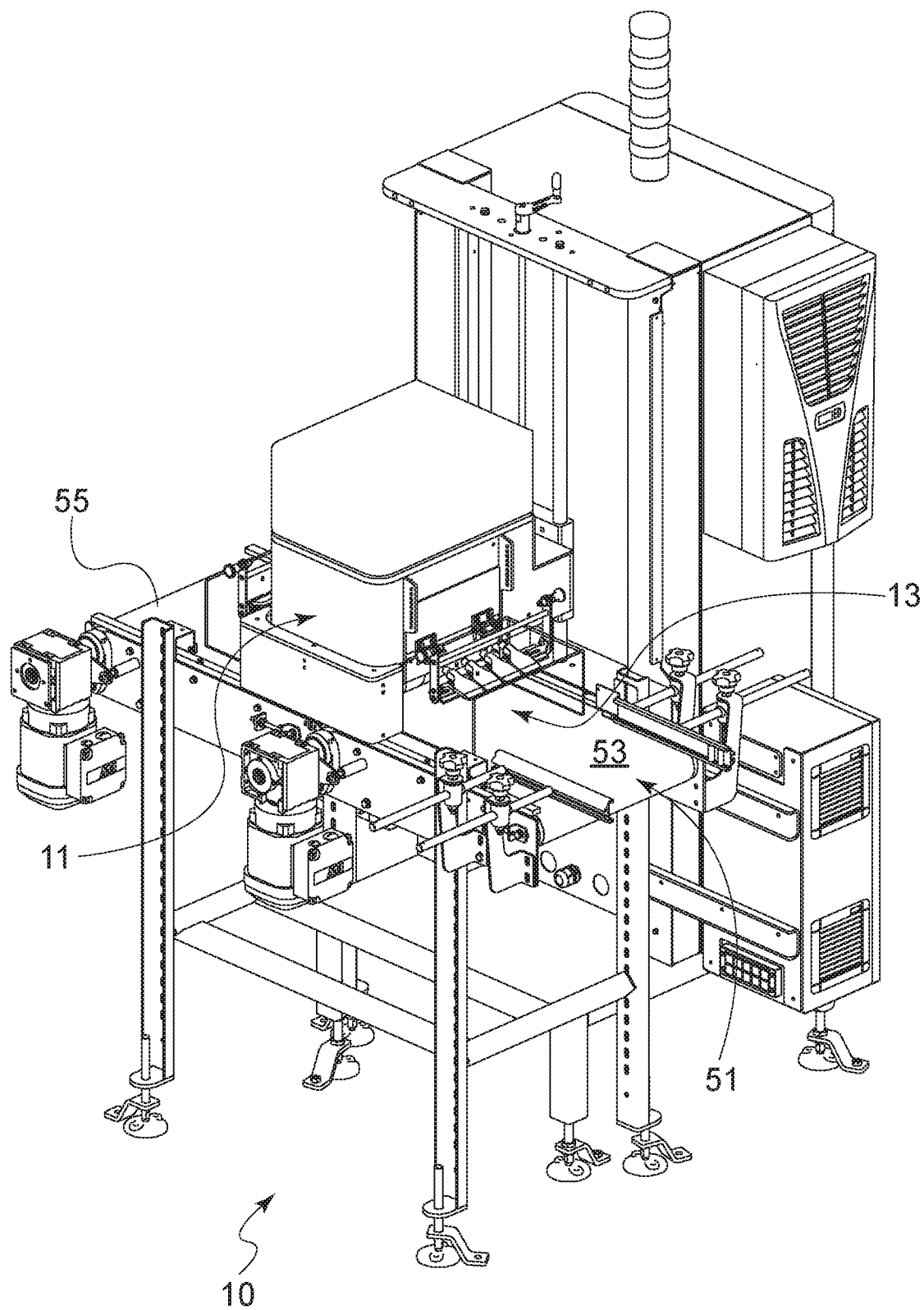
FIG. 1 is a side perspective view of an equipment in which the apparatus according to the invention is incorporated.

Referring to FIG. 1, according to the embodiment of the invention illustrated, a sample container to be tested is placed in detection zone 13, defined in an equipment 10 incorporating the apparatus according to the invention, by means of a positioning assembly 51. According to this embodiment, positioning assembly 51 includes a pair of conveyor belts 53, 55 for the introduction or entrance of the container into detection zone 13 and for the extraction or exit of said container from detection zone 13, respectively. Preferably, said positioning assembly 51 further includes a pair of side guides 55a, 55b for correctly positioning the container in detection zone 13, preferably centrally of zone 13.

Optionally, the method according to the invention includes a step in which the sample container undergoes a compression or squeezing step, for promoting possible gas spillage. Preferably, said squeezing step is performed by means of a squeezing assembly including rotatable rollers.

Figure 2:
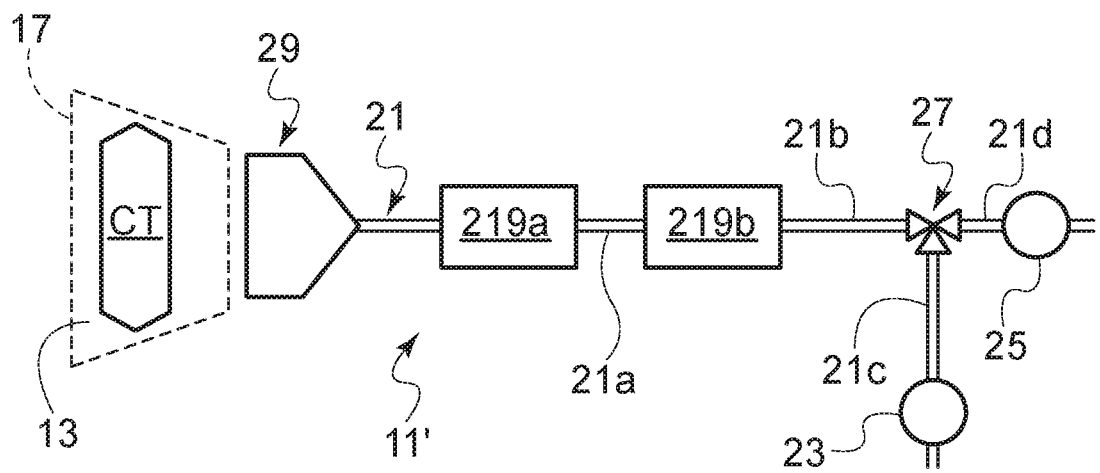
FIG. 2 is a schematic representation of a preferred embodiment of the apparatus according to the invention.

Reference will now be made to FIG. 2 for describing a preferred embodiment of an apparatus 11, made in accordance with a particular embodiment of the invention and arranged to implement a method of recognizing leakages capable of considerably increasing the sensitivity of the recognition itself.

Referring to FIG. 2, there is schematically shown a detection apparatus 11 made in accordance with a preferred embodiment of the invention and including a detection zone 13. Detection zone 13 is arranged to receive a sealed container CT that is to be checked to ascertain the presence of possible leakages, i.e. of openings capable of putting the content of container CT in communication with the surrounding environment outside the container. In accordance with a preferred embodiment of the invention, detection zone 13 is defined by a supporting structure 15 including a frame 17 and it communicates with the outside environment.

In FIG. 2, reference numerals 219a and 219b denote two gas sensors serially connected in a same duct 21 for the gases coming from detection zone 13.

Both gas sensors 219a, 219b are arranged to generate an electrical signal indicative of the presence of a specific gas in a gas mixture passing through said sensors 219a, 219b. In a particular embodiment of the invention, said gas is $CO_2$ and sensors 219a, 219b are infrared $CO_2$ sensors each including a measurement cell equipped with an IR emitter and a corresponding photodetector. The gas mixture to be analysed, when passing through the measurement cell in sensor 219a or 219b, causes an alteration in at least one parameter of an electrical signal passing in an electrical circuit associated with the photodetector. The alteration is proportional to the amount of $CO_2$ being present, i.e. to the $CO_2$ concentration in the mixture passing through sensor 219a, 219b. In other embodiments, gas sensors of different type could be provided to detect $CO_2$ with different modalities, or to detect gases of different kinds, for instance He or $H_2$. Such sensors are known to the skilled in the art and therefore they will not be described in more detail.

In the embodiment illustrated, apparatus 11 includes a suction fan 25 having an inlet port 25a, through which air is sucked, communicating with said duct 21, and an outlet port 25b for exhausting the air sucked to the outside. Always with reference to the embodiment illustrated, duct 21 includes a first segment 21*a* connected between detection zone 13 and the first sensor 219*a*, a second segment 21*b* connected between sensor 219*a* and the second sensor 219*b*, and a third segment 21*c* connected between the second sensor 219*b* and suction fan 25.

In this preferred embodiment of the invention, segment 21*a* communicates with detection zone 13 through a diffuser 29. According to the invention, a single detection zone 13 could be equipped with a plurality of diffusers 29. For instance, diffusers 29 surrounding container CT passing in zone 13 could be provided, so that substantially the whole of the side surface of container CT passing in zone 13 is submitted to the effect of the air suction by diffusers 29.

Hereinafter, the operation principle of this embodiment of the detection method according to the invention will be explained in more detail.

Figure 3A:
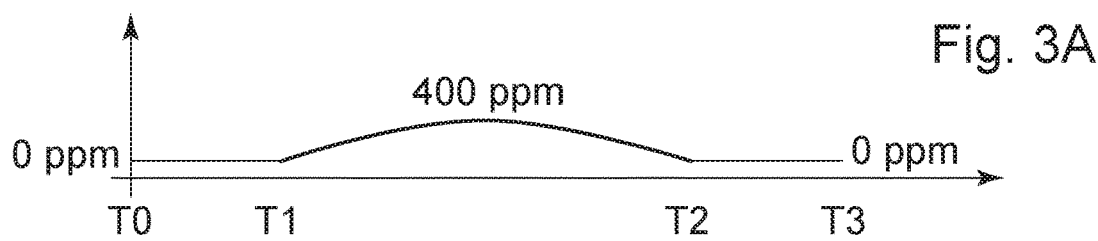
FIGS. 3A to 3E are graphs of as many tracer gas concentration signals.

Referring to FIG. 3A, there is shown the graph, against time, of the variation of the $CO_2$ concentration, measured by means of an indicative signal generated by anyone of said $CO_2$ sensors 219*a*, 219*b*. The graph in FIG. 3A relates to an operation cycle of apparatus 11 according to the invention, when no sample to be tested is present or when the sample is perfectly hermetic, i.e. wholly free from leakages.

In accordance with the preferred embodiment of the method according to invention, at time $T_0$ detection zone 13 of an apparatus 11 made in accordance with the invention is substantially free from tracer gas. The atmosphere in the detection zone can be rich, for instance, in nitrogen or contain a gas mixture having a high nitrogen concentration.

At time $T_1$ the suction step is started to suck air from detection zone 13, through the same diffusers 29. Air sucked from detection zone 13 by means of suction fan 25 flows along duct 21 and is intercepted first by sensor 219*a* and then by sensor 219*b*, both of which detect for instance 400 ppm, i.e. the typical atmospheric concentration of $CO_2$.

At time $T_2$ the suction step is stopped and nitrogen, for instance, is again introduced into detection zone 13 to flush the detection zone from tracer gas residues. Nitrogen sucked through duct 21 is intercepted by sensors 219*a*, 219*b* arranged along duct 21, which detect again 0 ppm $CO_2$, since nitrogen is again the only gas licking said sensors 219*a*, 219*b*. At time $T_3$ the cycle is stopped.

Figure 3B:
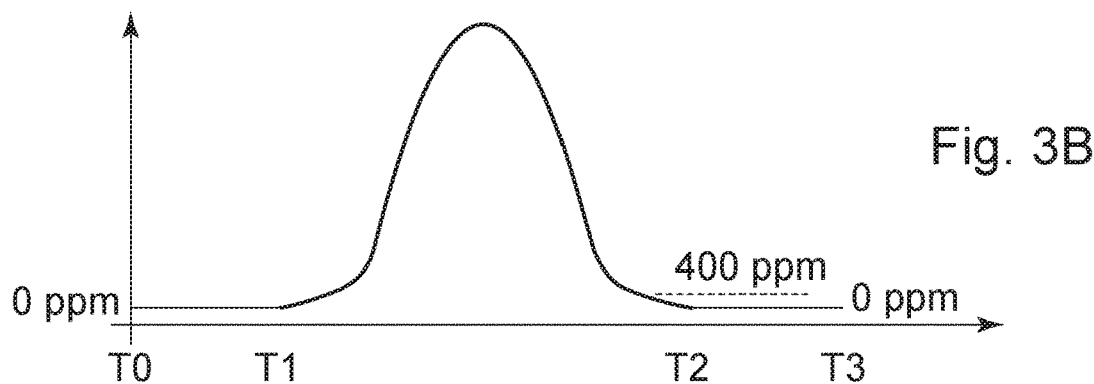

Referring to FIG. 3B, reference is now made to a sample container to be tested passing in detection zone 13 of apparatus 11 containing a tracer gas that is assumed to be $CO_2$.

FIG. 3B shows the graph, against time, of the variation of the $CO_2$ concentration measured by means of an indicative signal generated by $CO_2$ sensors 219*a* or 219*b*. The operation cycle is substantially the same as in the preceding case, yet, at time $T_1$, the sample container to be tested, which has a micro-hole from which $CO_2$ leaks, is made to pass at constant speed in detection zone 13. In the interval between time $T_1$ and time $T_2$ sensor 219*a* or 219*b* detects a $CO_2$ leak, as it can be appreciated from FIG. 3B. The $CO_2$ concentration at sensor 219*a* or 219*b* progressively increases up to a maximum, and then decreases as the passing sample, and consequently the micro-hole, is moving away from detection zone 13. At time $T_2$, when the container being tested has already passed through detection zone 13 and consequently the micro-leak has moved beyond diffusers 29 through which gases have been sucked, suction is stopped and the flushing step with introduction of pure nitrogen, i.e. a gas substantially containing 0 ppm of $CO_2$, is started again. At time $T_3$ the cycle is stopped.

The operation cycle of apparatus 11 described above with reference to FIGS. 3A and 3B can also be carried out by using compressed air (400 ppm, dashed line in the diagram of FIG. 3B) instead of pure nitrogen (solid line in the graph of FIG. 3B) as flushing gas, or by using other gas mixtures where the $CO_2$ concentration is lower than that due to the micro-leak detected.

Figure 3C:
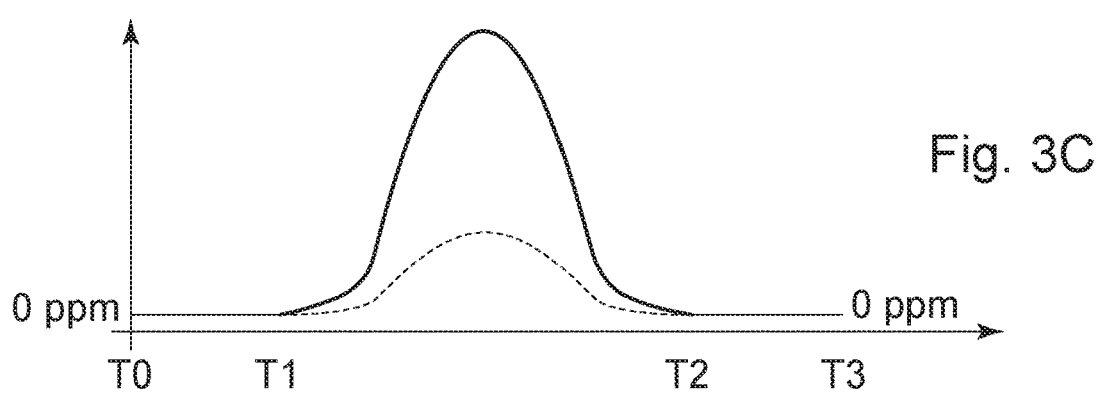

Referring to FIG. 3C, there is shown the graph, against time, of the variation of the $CO_2$ concentration measured at sensor 219*a* or 219*b* in case in the case of two passing samples exhibiting gas leaks of different amounts, namely a small amount (dashed line) and a great amount (solid line). As it can be appreciated, the shape of the curve of the signal indicative of the variation of the concentration of tracer gas, $CO_2$ in the example illustrated, is substantially always the same. As it will become even more apparent from the following description, experiments carried out have actually allowed determining that the graphical appearance of the signal indicative of the gas concentration in interval $T_1$-$T_2$ has a Gaussian-like behaviour. What is different obviously is the signal intensity, which depends on the size of the opening causing the leakage, on the tracer gas concentration in the gas mixture spilling from the container and on whether and how much the sample is mechanically stressed by the squeezing assembly, if any (the stronger the squeezing, the higher the leakage intensity detected by sensor 219*a* or 219*b*).

Figure 3D:
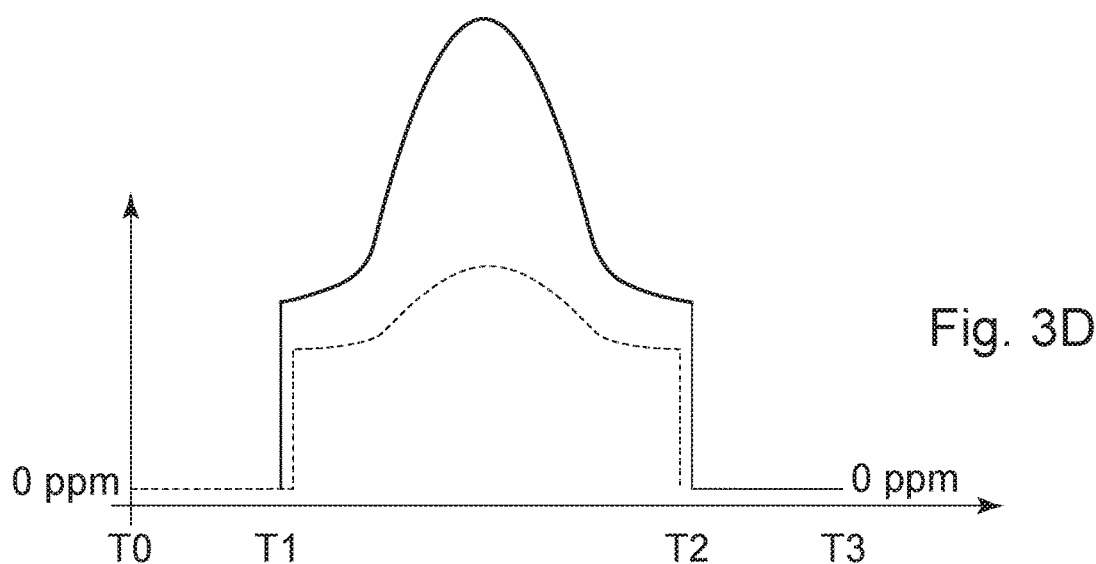
Figure 3E:
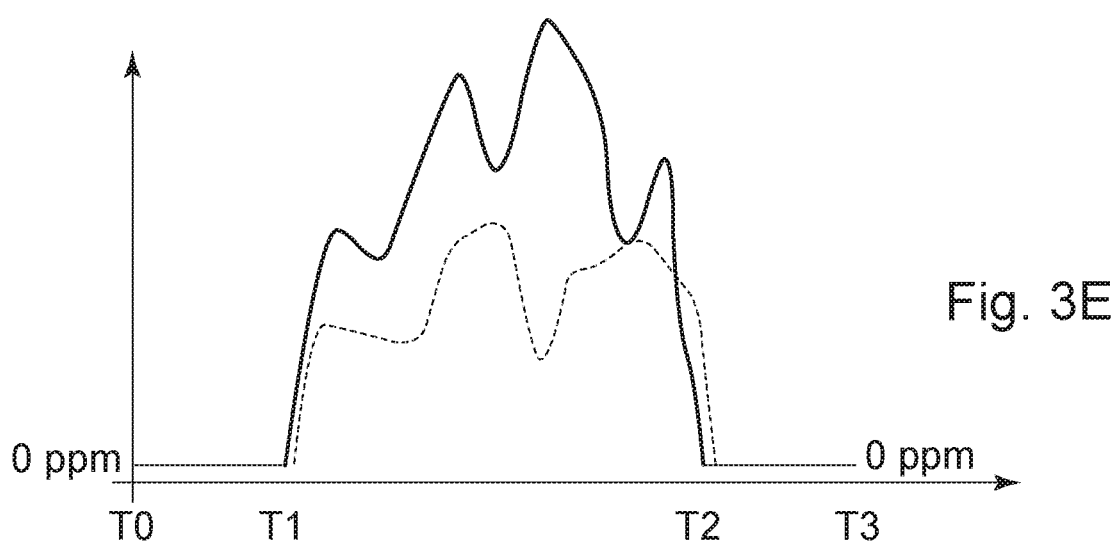

Referring to FIGS. 3D and 3E, there is shown the graph, against time, of the variation of the $CO_2$ concentration in case of samples passing at high speed, when perturbations in the concentration of tracer gas, that is of ambient $CO_2$ in the example illustrated, occur in zone 13 in interval $T_1$-$T_2$ Referring in particular to FIG. 3D, there is shown the graph, against time, of the variation of the $CO_2$ concentration measured at sensor 219*a* or 219*b* in case of two passing samples exhibiting gas leaks of different amounts, namely a small amount (dashed line) and a great amount (solid line), when a very high and constant background value of tracer gas, $CO_2$ in the specific case, with variable offset, is present in interval $T_1$-$T_2$.

Referring in particular to FIG. 3E, there is shown the graph, against time, of the variation of the $CO_2$ concentration measured at sensor 219*a* or 219*b* in case of two passing samples exhibiting gas leaks of different amounts, namely a small amount (dashed line) and a great amount (solid line), when a very high and highly fluctuating background value of tracer gas, $CO_2$ in the specific case, with strong turbulences and variable offsets, is present in interval $T_1$-$T_2$.

Figure 4:
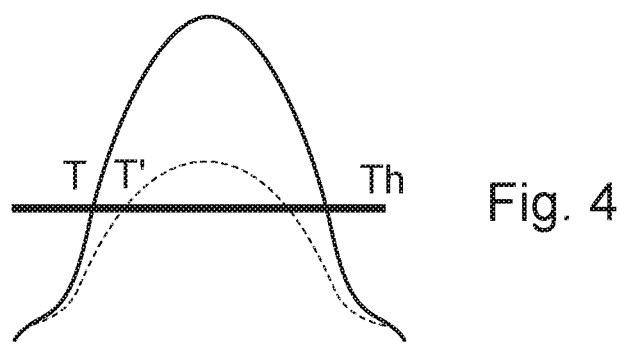
FIG. 4 is a graph comparing two tracer gas concentration signals of different intensities.

As it can be appreciated from FIG. 4, a detection method based on a fixed threshold for the tracer gas concentration has a number of limitations. First, being the threshold fixed, such a detection method is very sensitive to background gas offsets. Second, the instant at which the signal emitted by the sensor and indicative of the tracer gas concentration exceeds the fixed threshold and consequently causes signalling the occurrence of a leak, varies depending on the tracer gas concentration, that is depending on the leak amount. Always with reference to FIG. 4, where signals indicative of a leak of small amount (dashed line) and great amount (solid line) are shown and the threshold is identified by horizontal solid line Th, the instant at which the occurrence of a leak is signalled actually has a time shift T→T' varying as the tracer gas concentration varies.

Figure 5A:
FIGS. 5A to 5C are graphs of as many gas concentration signals that do not indicate a leakage.
Figure 5B:
Figure 5C:

Such an approach in which a threshold fixed relative to the signal generated by a gas sensor is set is moreover scarcely performant in case of micro-leaks of very small amounts, and moreover gives rise to the problem of false positives, i.e. false signallings of leak occurrence. More specifically, referring to FIG. 5A, an example is shown in which a small variation in the tracer gas concentration at the gas sensor, due to a micro-opening in the container, would not be sufficient to allow recognising that the container is not correctly sealed and hence is possibly to be discarded. FIG. 5B shows an example in which a fluctuation in the concentration of a gas of the same kind as the tracer gas introduced in the container, due to causes external to the container, has been misinterpreted as a leak since it is sufficient to generate, at the gas sensor, a signal whose value exceeds the fixed threshold set. FIG. 5C shows an example similar to the previous one, in which background gas turbulences, due to causes external to the container, have been misinterpreted as a leak.

Too low a fixed threshold would therefore make practically impossible distinguish the transitions due to micro-leaks from the ones due to background noise, which are the majority. The presence of the background noise compels therefore to set the threshold to a value significantly different from zero and, anyway, with an absolute value higher than the noise "peaks". In the specific case this means therefore that a leak would be recognized only if its amount is much greater than the background fluctuations.

The measurement method according to the alternative embodiment of the invention, capable of considerably increasing the sensitivity of the detection itself, exploits a principle allowing precisely establishing the instant, i.e. the timing, at which a leak has occurred. Establishing a precise and repeatable timing at which a leak occurrence is signalled allows considerably narrowing the interval of analysis of the measurement on the moving sample near the passage of the sample container affected by the leak to be detected. The precise timing selection makes the measurement method less sensitive to ambient turbulences that can originate signals that are very similar to the signal characteristic of a leak and could therefore misinterpreted as leak-indicative signals.

As stated before with reference to FIG. 4, by assuming a fixed threshold Th exceeding of which triggers signalling the presence of tracer gas, as the amplitude of the signal indicative of the presence of gas originated by a leak varies, also the delays of instants T, T' at which the leak is signalled due to the threshold being exceeded vary. More particularly, said delays increase as the signal amplitude decreases. Assuming that the signal generated by sensor $219a$ or $219b$ is sent to a comparator device arranged to generate a logical signal "0" when the intensity of the input signal of the comparator is below the threshold value set, and a logical signal "1" when the intensity of the input signal of the comparator exceeds the threshold value set, due to the delays pointed out above the time intervals between the transitions from logical state "0" to "1" do not correspond to the correct time intervals at which the variation of the tracer gas concentration at the sensor has occurred. This effect of the timing dependence on the signal amplitude is referred to as "walk" effect in the scientific literature and, as pointed out above, a timing technique based on a fixed threshold is affected by a significant "walk" effect.

Moreover, the signals generated by the gas sensor are generally affected by a significant background noise, which causes an equally significant "jitter" effect, i.e. a fluctuation, in the timing.

The substantial similarity in the shapes of the curves of the signal indicative of the tracer gas concentration in the gas mixture arriving at the sensor, notwithstanding the variation in the signal amplitude, has advantageously enabled adoption of a substantially walk-free timing technique, consisting in making the transition of the timing logical signal occur when the signal exceeds a threshold that ideally, for each signal, adapts itself to a defined fraction of the maximum of the curve, for instance when the signals attain half their final amplitude.

Providing such a "floating" threshold is comparable to a so called "Constant Fraction Timing" or "Constant Fraction Discrimination" (CFD).

Reference will now be made again to FIG. 2 for describing a preferred embodiment of an apparatus 11 made in accordance with a particular embodiment of the invention, arranged to implement the detection method capable of considerably increasing the sensitivity of the detection itself.

As disclosed hereinbefore, apparatus 11 includes a pair of sensors $219a$ and $219b$ connected to each other by duct segment $21b$ the internal volume of which is known: i.e. the length and the cross-sectional size of said duct segment $21b$ are known and constant. Such a duct segment $21b$ separating sensors $219a$ and $219b$ substantially forms a corresponding delay line in gas propagation along duct 21.

Figure 6:
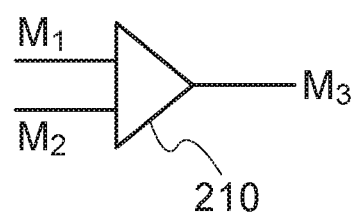
FIG. 6 is a diagram of the comparison circuit of the second embodiment of the invention.

Referring also to FIG. 6, corresponding signals $M_1$ and $M_2$ coming from the two sensors $219a$ and $219b$ are sent to a comparator 210 and output signal $M_3$ of comparator 210 will indicate the occurrence of a leak from a passing container when the signal of the second sensor $219b$ exceeds the floating threshold determined by the variable signal of the first sensor $219a$ at the same time instant.

This technique advantageously allows having a discrimination time instant independent of the amplitude and less sensitive to jitter and walk.

CFD discrimination moreover makes the system more performant in case of low intensity leak signals and increases measurement sensitivity. Furthermore, the detection method is less affected by background variations, or turbulence effects, of external $CO_2$. This detection technique moreover allows preventing false positives, i.e. preventing external fluctuations from being misinterpreted as leak measurements.

Figure 7:
FIG. 7 is a graph of a pair of gas concentration signals generated by a pair of sensors in the second embodiment of the invention.

In the example shown in FIG. 7, two switches, i.e. two transitions, 0→1 of the comparator occur in the proper measurement interval. Yet such switches occur at time instants different from the instant at which reading is made. If the switches occur at too close instants, they are considered by the system as being due to background noise and not to events determined by a leak of $CO_2$.

In an alternative embodiment of the apparatus made in accordance with this particular embodiment of the invention, the signal of the second sensor is replaced by a second signal of a first sensor in which the gas flow is made to pass a second time in opposite direction. In other words, according to such an alternative embodiment, the gas flow coming from detection zone 13 passes through the first sensor $219a$ by flowing along the duct in a first direction towards suction fan 25, and then in the opposite direction towards sensor $219a$. Clearly in this embodiment a single and unique sensor could even be provided.

In this embodiment, the arrangement is similar to that shown in FIG. 2, yet without the sensor denoted $219b$. Delay lines $21a$ and $21b$ coincide, and this single line can have a length at will. In this manner, the same line $21a$, $21b$ becomes a gas accumulation chamber. When the flow is reversed, the Gaussian loss peak having passed through the first and single sensor $219a$ from the left to the right passes again through that same sensor in the opposite direction, from the right to the left. Sensor $219a$ has acquired two signals with a known delay and, at this time, it is possible to process the signals by reproducing constant fraction discrimination. Since two Gaussian peaks have been acquired, one due to the passage in one direction and one due to the passage in the other direction, it is possible to digitally process them by reproducing the constant fraction discrimination.

INDUSTRIAL APPLICABILITY

The invention finds industrial application in several fields, for detecting leaks and micro-leaks from containers of substantially any kind, either compressible or rigid. The invention can also be applied for detecting leakages of liquids, for instance water or beverages, from pressurised rigid containers.

The invention as described and illustrated can undergo several variants and modifications falling within the same inventive principle.

The invention claimed is:

1. A method for recognizing the presence of leakages from sealed containers, said method comprising the steps of:
    defining a detection zone (13) in which a sealed container (CT) will be placed;
    putting said detection zone (13) in communication with a first gas sensor (219a) through at least one duct (21);
    placing a container (CT) in said detection zone (13); and
    sucking a gas flow from said detection zone (13) through said duct (21) and transferring said gas flow to the first gas sensor (219a) in a first direction to generate a first signal indicative of the presence of gas(es) in said gas flow transferred in the first direction,
    wherein the method further comprises a step in which said gas flow that has reached the first gas sensor is transferred to the first gas sensor for a second time in a second direction opposite to the first direction to generate a second signal indicative of the presence of gas(es) in said gas flow transferred in the second direction, and
    wherein the first and second signals generated by the first gas sensor are processed for determining the presence of a gas leakage in said container (CT).

2. The method according to claim 1, wherein the first and second signals generated by the the first gas sensor are compared with each other so as to generate a signal indicative of the presence of a gas leakage when at the same instant the level of the second signal exceeds the level of the first signal.

3. The method according to claim 2, wherein the signal indicative of the presence of a gas leakage is generated when the condition according to which at the same instant the level of the second signal exceeds the level of the first signal has repeated at least twice consecutively.

4. The method according to claim 2, wherein the signal indicative of the presence of a gas leakage is generated when the condition according to which at the same instant the level of the second signal exceeds the level of the first signal has repeated at least twice consecutively at a rate higher than a predetermined noise threshold.

5. An apparatus for recognizing the presence of leakages from sealed containers, said apparatus comprising:
    a detection zone (13) adapted to receive a sealed container (CT);
    a first gas sensor (219a) capable of generating a signal indicative of the presence of gas(es);
    a duct (21) communicating with said detection zone (13) and said first gas sensor;
    a suction fan (25) provided with an inlet port (25a) from which air is sucked and which communicates with said duct (21),
    wherein the apparatus further comprises transfer means capable of transferring back to the first gas sensor, in a second direction, an air flow that has been sucked from said detection zone, has been transferred to the first gas sensor in a first direction and has left the first gas sensor, the second direction being opposite to the first direction, and the first gas sensor being configured to generate a first and a second signal indicative of the presence of gas(es) in the air flow passing through the first gas sensor in the first and second direction, respectively,
    wherein said transfer means includes a reversible fan or a reversible suction fan, and
    wherein the apparatus further comprises processing means for processing the first signal and the second signal generated by the first gas sensor, for determining the presence of a gas leakage in said container (CT).

6. The apparatus according to claim 5, wherein an electronic control unit is provided and programmed to compare the first and second signals generated by the first gas sensor, and to generate a signal indicative of the presence of a gas leakage when at the same instant the level of the second signal exceeds the level of the first signal.

* * * * *